(12) United States Patent
Inagaki et al.

(10) Patent No.: US 9,508,981 B2
(45) Date of Patent: Nov. 29, 2016

(54) ACTIVE MATERIAL FOR BATTERIES, NON-AQUEOUS ELECTROLYTE BATTERY, AND BATTERY PACK

(71) Applicant: KABUSHIKI KAISHA TOSHIBA, Tokyo (JP)

(72) Inventors: Hiroki Inagaki, Yokohama Kanagawa (JP); Norio Takami, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 91 days.

(21) Appl. No.: 14/604,376

(22) Filed: Jan. 23, 2015

(65) Prior Publication Data

US 2015/0132623 A1    May 14, 2015

Related U.S. Application Data

(63) Continuation of application No. PCT/JP2013/069925, filed on Jul. 23, 2013.

(30) Foreign Application Priority Data

Jul. 24, 2012   (JP) .................................. 2012-163490

(51) Int. Cl.
| | | |
|---|---|---|
| *H01M 4/58* | (2010.01) | |
| *H01M 4/131* | (2010.01) | |
| *H01M 4/485* | (2010.01) | |
| *C01G 23/00* | (2006.01) | |
| *C01G 23/047* | (2006.01) | |
| *C01B 25/45* | (2006.01) | |
| *H01M 10/0525* | (2010.01) | |

(52) U.S. Cl.
CPC .............. *H01M 4/131* (2013.01); *C01B 25/45* (2013.01); *C01G 23/001* (2013.01);
(Continued)

(58) Field of Classification Search
CPC .. H01M 4/131; H01M 4/485; H01M 4/5825; H01M 10/0525; C01B 25/45; C01G 23/001; C01G 23/005; C01G 23/047; C01P 2002/52; Y02E 60/122
See application file for complete search history.

(56) References Cited

U.S. PATENT DOCUMENTS

| | | | | |
|---|---|---|---|---|
| 8,343,665 B2 * | 1/2013 | Harada | ................... | H01M 4/02 423/598 |
| 2008/0318044 A1 * | 12/2008 | Tian | ........................ | A61L 27/06 428/401 |

(Continued)

FOREIGN PATENT DOCUMENTS

| | | |
|---|---|---|
| JP | 2008-034368 | 2/2008 |
| JP | 2008-117625 | 5/2008 |

(Continued)

OTHER PUBLICATIONS

International Search Report issued Oct. 8, 2013 in PCT/JP2013/069925 filed Jul. 23, 2013.

(Continued)

*Primary Examiner* — Raymond Alejandro
(74) *Attorney, Agent, or Firm* — Oblon, McClelland, Maier & Neustadt, L.L.P.

(57) ABSTRACT

According to one embodiment, a non-aqueous electrolyte battery is provided. The non-aqueous electrolyte battery includes a negative electrode contained a negative electrode active material. The negative electrode active material includes a monoclinic β-type titanium-based oxide or lithium titanium-based oxide. The monoclinic β-type titanium-based oxide or lithium titanium-based oxide has a peak belonging to (011), which appears at $2\theta_1$ in a range of 24.40° or more and 24.88° or less, in an X-ray diffraction pattern obtained by wide angle X-ray diffractometry using CuKα radiation as an X-ray source.

18 Claims, 5 Drawing Sheets

(52) U.S. Cl.
CPC ......... *C01G 23/005* (2013.01); *C01G 23/047* (2013.01); *H01M 4/485* (2013.01); *H01M 4/5825* (2013.01); *C01P 2002/52* (2013.01); *C01P 2002/72* (2013.01); *C01P 2002/76* (2013.01); *C01P 2002/77* (2013.01); *C01P 2006/12* (2013.01); *H01M 10/0525* (2013.01); *Y02E 60/122* (2013.01); *Y02T 10/7011* (2013.01)

(56) References Cited

U.S. PATENT DOCUMENTS

| 2011/0049420 A1* | 3/2011 | Ellenwood | C01G 53/006 252/182.1 |
|---|---|---|---|
| 2011/0052994 A1 | 3/2011 | Harada et al. | |
| 2012/0129015 A1 | 5/2012 | Inagaki et al. | |
| 2012/0183836 A1 | 7/2012 | Harada et al. | |

FOREIGN PATENT DOCUMENTS

| JP | 2011-048947 | 3/2011 |
|---|---|---|
| JP | 2012-124182 | 6/2012 |
| JP | 2013-157335 | 8/2013 |
| WO | 2009/028553 | 3/2009 |
| WO | 2010/137156 | 12/2010 |
| WO | 2011/013254 | 2/2011 |

OTHER PUBLICATIONS

R. Marchand, et al. "A New Form of Titanium Dioxide and the Potassium Octatitanate . . . " Material Research Bulletin, vol. 15, pp. 1129-1133., (1980).

* cited by examiner

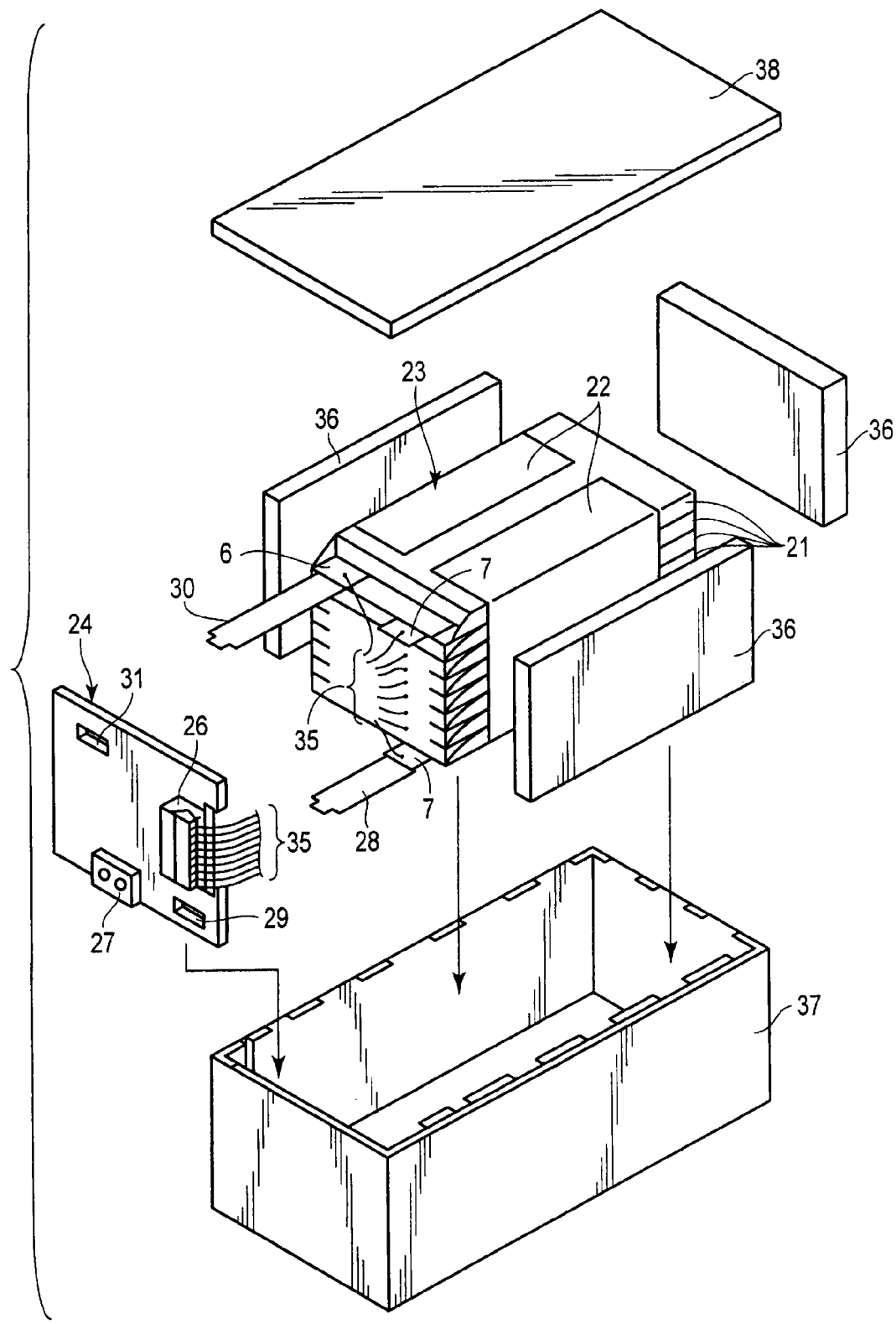
F I G. 3

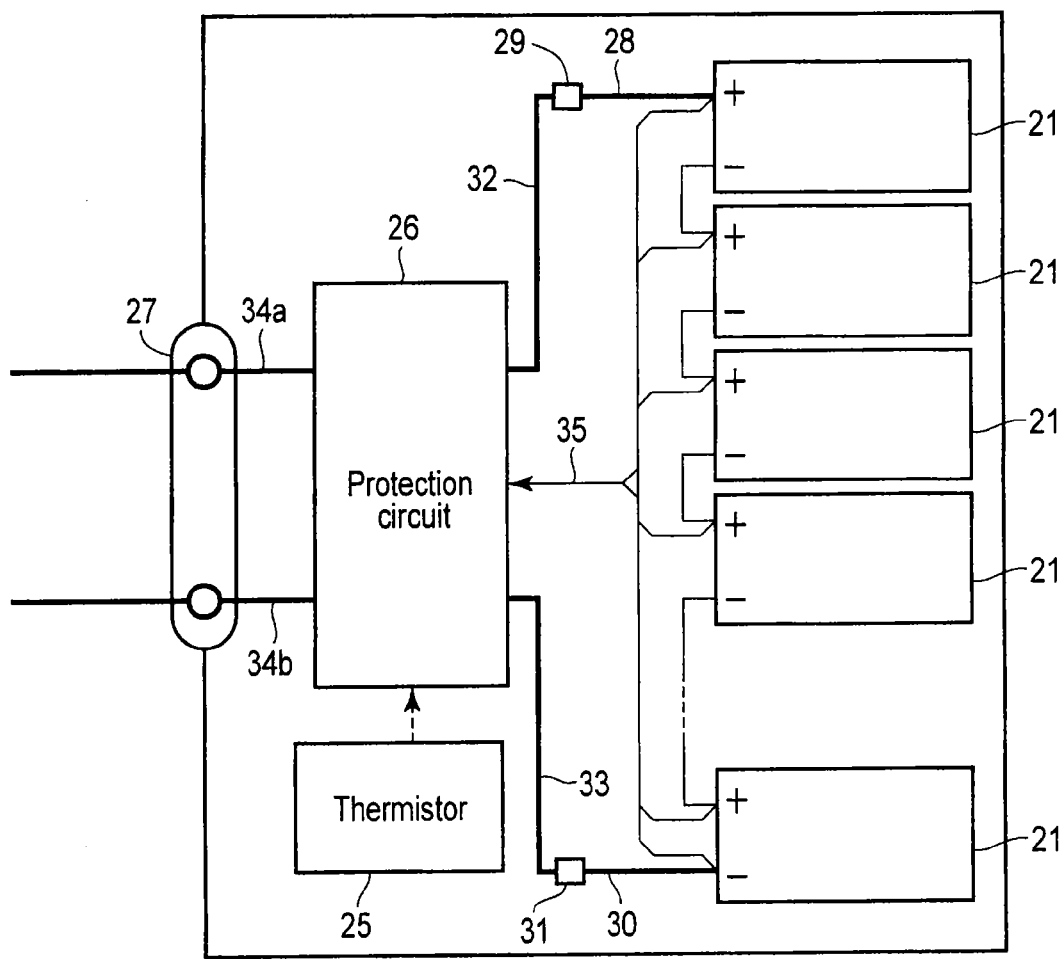
F I G. 4

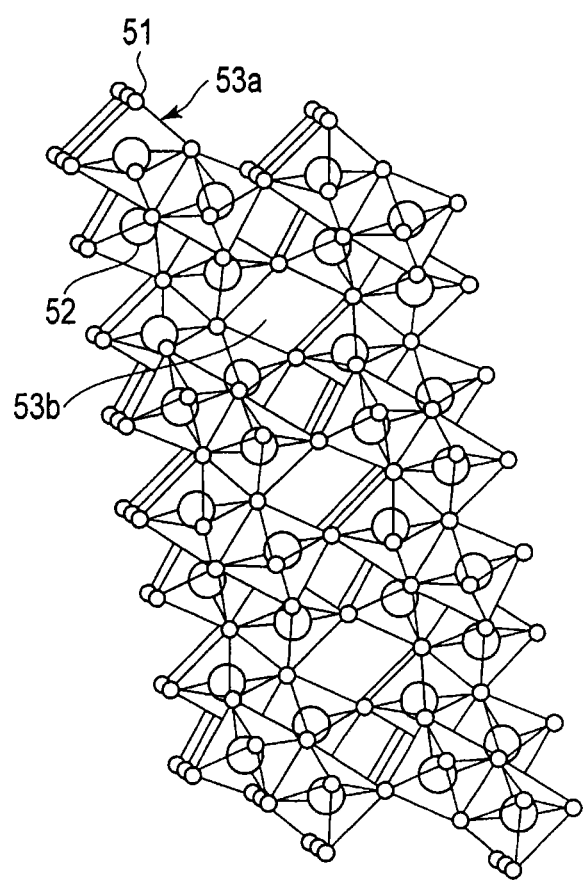
F I G. 7

ACTIVE MATERIAL FOR BATTERIES, NON-AQUEOUS ELECTROLYTE BATTERY, AND BATTERY PACK

CROSS REFERENCE TO RELATED APPLICATIONS

This application is a Continuation Application of PCT Application No. PCT/JP2013/069925, filed Jul. 23, 2013 and based upon and claiming the benefit of priority from Japanese Patent Application No. 2012-163490, filed Jul. 24, 2012, the entire contents of all of which are incorporated herein by reference.

FIELD

Embodiments described herein relate generally to an active material for batteries, a non-aqueous electrolyte battery, and a battery pack.

BACKGROUND

A titanium-based oxide or lithium titanium-based oxide having a monoclinic β-type structure (hereinafter referred to as $TiO_2(B)$) has recently been noted as an active material for a non-aqueous electrolyte battery. Spinel type lithium titanate ($Li_4Ti_5O_{12}$) has been put into practical use. The number of lithium ions which can be inserted and released per unit chemical formula of the spinel type lithium titanate is three. Therefore, the number of lithium ions which can be inserted and released per titanium ion is 3/5, i.e., the theoretical maximum number is 0.6. In contrast, the maximum number of lithium ions which can be inserted and released per titanium ion is 1.0. $TiO_2(B)$ therefore has a theoretical capacity of approximately 335 mAh/g which is an excellent property.

However, a practical electrode capacity of $TiO_2(B)$ is approximately 170 to 200 mAh/g, which is remarkably deteriorated as compared with the theoretical capacity. This is considered to result from the fact that although a number of sites of Li hosts exist in a crystal structure of $TiO_2(B)$, a small number of mobile Li ions are effective since Li ions in a solid have small diffusivity.

BRIEF DESCRIPTION OF THE DRAWINGS

FIG. 3 is an exploded perspective view showing an example of a battery pack of the embodiments;

FIG. 4 is a block diagram showing the battery pack of FIG. 3;

FIG. 7 is an illustration schematically showing a crystal structure of monoclinic β-type titanium-based oxide or lithium titanium-based oxide $TiO_2(B)$.

DETAILED DESCRIPTION

Figure 1:
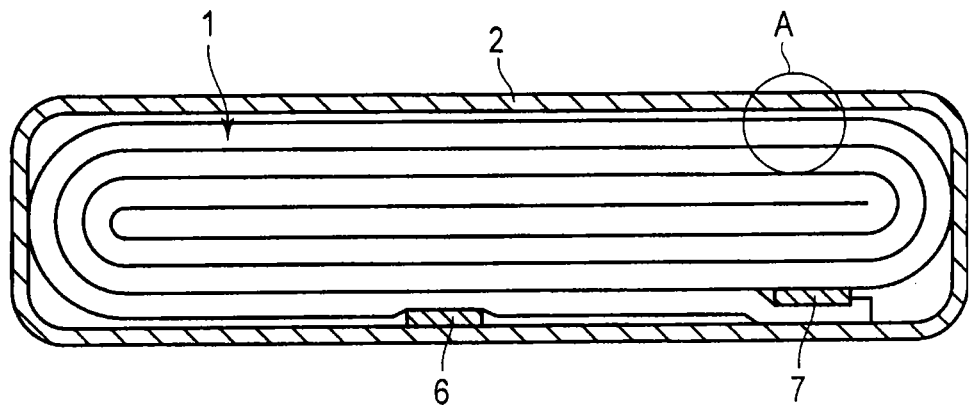
FIG. 1 is a cross-sectional view showing an example of a flat type non-aqueous electrolyte battery of embodiments.

Hereinafter, an active material for batteries of the embodiments will be hereinafter described in detail.

In general, according to one embodiment, an active material for batteries of the embodiments comprises a monoclinic β-type titanium-based oxide or lithium titanium-based oxide. The monoclinic β-type titanium-based oxide or lithium titanium-based oxide has a peak belonging to (011), which appears at $2\theta_1$ in a range of 24.40° or more and 24.88° or less, in an X-ray diffraction pattern obtained by wide angle X-ray diffractometry using CuKα radiation as an X-ray source.

The position $2\theta_1$ of the peak belonging to (011) of the monoclinic β-type titanium-based oxide or lithium titanium-based oxide contained in the active material for batteries of the embodiments is smaller than position $2\theta_0$ of the peak, which is 24.93°, belonging to (011) of the existing monoclinic β-type titanium-based oxide or lithium titanium-based oxide.

The "existing monoclinic β-type titanium-based oxide or lithium titanium-based oxide" indicates that the position $2\theta_0$ of the peak belonging to (011) based on 46-1237 and 46-1238 of JCPDS (Joint Committee on Powder Diffraction Standards) card which is X-ray diffraction data is 24.93°. The monoclinic β-type titanium-based oxide or lithium titanium-based oxide (hereinafter referred to as $TiO_2(B)$) has a crystal structure of a tunnel structure as shown in FIG. 7. $TiO_2(B)$ is represented by a general formula $Li_xTiO_2$ (0≤x≤1). In this crystal structure, titanium ions 51 and oxide ions 52 form skeletal structure parts 53a. The skeletal structure parts 53a are bonded and coupled to each other. A clearance part 53b is present in the adjacent skeletal structure parts 53a. The clearance part 53b can be a host site for insertion of a foreign atom species. In addition, a site capable of absorbing and desorbing lithium also exists on a crystal surface of $TiO_2(B)$. $TiO_2(B)$ has a property of permitting the foreign atom to be inserted in the cavity portion 53b, and to be absorbed and desorbed on the crystal surface. For this reason, $TiO_2(B)$ can absorb and desorb a number of elements and organic compounds other than lithium ions. If $Li^+$ is inserted in the tunnel-like clearance part 53b, $Ti4^+$ forming the skeleton is reduced to $Ti3^+$ and the electrical neutrality of crystal is maintained. Thus, since $TiO_2(B)$ has one $Ti4^+$ per unit cell, one $Li^+$ at the maximum can be newly inserted between layers, in theory. The x value in the general formula $Li_xTiO_2$ falls within a range of 0≤x≤1, and a theoretical capacity is approximately 335 mAh/g. This theoretical capacity is approximately twice as great as that of, for example, titanium oxide such as $Li_4Ti_5O_{12}$.

In the monoclinic β-type titanium-based oxide or lithium titanium-based oxide, however, diffusion of lithium ions tends to be delayed and large current characteristics tends to be deteriorated.

The position $2\theta_0$ of the peak belonging to (011) of the existing $TiO_2(B)$ is 24.93° in the X-ray diffraction pattern obtained by wide angle X-ray diffractometry using CuKα rays as an X-ray source. While in the monoclinic β-type titanium-based oxide or lithium titanium-based oxide ($TiO_2(B)$) contained in the active material for batteries of the embodiments, the position $2\theta_1$ of the peak belonging to (011) of the $TiO_2(B)$ of the embodiment is in a range of 24.40° or more and 24.88° or less, which is smaller than 24.93°, in the same X-ray diffraction pattern. In other words, this indicates that the crystalline lattice in $TiO_2(B)$ of the embodiments is expanded as compared with the existing $TiO_2(B)$. As a result, the characteristics of insertion and desorption of lithium ions can be enhanced, and excellent diffusivity of lithium ions can be achieved. Therefore, the active material for batteries containing TiO$_2$(B) having the above characteristics can contribute to the excellent large current performances at a large capacity when the active material is incorporated into a battery.

In TiO$_2$(B) in which the position (2θ) of the peak belonging to (011) exceeds 24.88°, since the position of the peak becomes close to the position)(24.93° of the peak of existing TiO$_2$(B), the characteristics of insertion and desorption of lithium ions can hardly be enhanced. On the other hand, in TiO$_2$(B) in which the position (2θ) of the peak belonging to (011) is less than 24.40°, i.e., greatly displaced from the position of the peak (2θ) of existing TiO$_2$(B), the crystal structure may become unstable, and the capacity and the large current performances may be deteriorated.

The position 2θ$_1$ of the peak belonging to (011) may preferably fall within a range of 24.40° or more and 24.85° or less.

TiO$_2$(B) in which the position 2θ$_1$ of the peak belonging to (011) falls within a range of 24.40' or more and 24.88° or less may have a composition containing, for example, V and/or Ta, and P. The total contents of V and Ta may preferably be 0.3 at % or more and 5 at % or less relative to the monoclinic β-type titanium-based oxide or lithium titanium-based oxide. The content of P may preferably be 0.03 at % or more and 1 at % or less relative to the monoclinic β-type titanium-based oxide or lithium titanium-based oxide.

The contents of the elements can be measured by ICP-OES (Inductively Coupled Plasma-Optical Emission spectroscopy). Measurement of the contents of the elements in the ICP-OES can be performed in, for example, a method mentioned below. A battery is disassembled in a discharging state, an electrode (for example, a negative electrode) is taken out, and a negative electrode layer of the electrode is deactivated in water. After that, a titanium-based oxide or lithium titanium-based oxide (containing V and/or Ta and P) in the negative electrode layer is extracted. The extraction treatment can be performed by, for example, eliminating a conductive agent and a binder in the negative electrode layer by heat treatment in air. After the extracted titanium-based oxide or lithium titanium-based oxide is weighed and collected in a vessel, the extracted oxide is subjected to acid fusion or alkali fusion to obtain a measurement solution. This measurement solution is subjected to ICP-OES by a measuring device (for example, SPS-1500V: product of SII Nanotechnology Inc.) to measure the contents of the elements.

If the total contents of V and Ta are 3 at % or more and 5 at % or less, an effect of enhancing the lithium ion diffusivity can easily be obtained. In addition, when the total contents of V and Ta are 3 at % or more and 5 at % or less, increase in a rate of a different phase in TiO$_2$(B) can be prevented, consequently, deterioration of the electric capacity and the large current performance can be prevented. Preferable total contents of V and Ta are 3 at % or more and 4 at % or less, relative to the monoclinic beta type titanium-based oxide or lithium titanium-based oxide.

When V and/or Ta is independently contained, if the content is increased, the rate of a different phase in TiO$_2$(B) tends to be increased and the electric capacity and the large current performance tend to be deteriorated. For this reason, if P is used together with V and/or Ta, a different phase can hardly appear in TiO$_2$(B), and an active material for batteries having further great electric capacity and further excellent large current characteristics as compared with a case of adding V and/or Ta singly can be obtained. It is considered that this is because P has a function of extending a solid solubility limit of V or Ta. When the content of P is 0.03 at % or more and 1 at % or less, the effect can be expressed sufficiently, and deterioration of the electric capacity and the large current performance can be prevented since a different phase of P itself is formed. The preferable content of P is 0.03 at % or more and 0.6 at % or less, relative to the monoclinic β-type titanium-based oxide or lithium titanium-based oxide.

TiO$_2$(B) of the embodiments may preferably have a primary particle diameter of 100 nm or more and 1 μm or less. If the primary particle diameter is 100 nm or more, handling is facilitated in terms of industrial production. If the primary particle diameter is 1 μm or less, lithium ions can be smoothly diffused into a solid of TiO$_2$(B).

TiO$_2$(B) of the embodiments may preferably have a specific surface area of 5 m$^2$/g or more and 50 m$^2$/g or less. TiO$_2$(B) having the specific surface area of 5 m$^2$/g or more can sufficiently ensure absorption and desorption sites for lithium ions. TiO$_2$(B) having the specific surface area of 5 m$^2$/g or less can easily be handled in terms of industrial production.

Next, a process of production of TiO$_2$(B) of the embodiments will be explained.

First, a starting material is prepared, which is obtainable by adding a predetermined amount of V and/or Ta and P to an alkali titanate compound such as Na$_2$Ti$_3$O$_7$, K$_2$Ti$_4$O$_9$, and Cs$_2$Ti$_5$O$_{12}$. Potassium titanate (K$_2$Ti$_4$O$_9$) can also be synthesized by a flux method. The alkali titanate compound containing at least one element can be synthesized by mixing a material containing V and/or Ta and P, a material containing Ti, and a material containing an alkali element such as Na, K, and Cs at predetermined ratios and by employing a general solid phase reaction. A method or a crystal shape in the synthesis of the starting material are not limited.

The starting material is washed well with pure water to eliminate impurities from the alkali titanate compound, and then subjected to acid treatment to exchange alkali cations with protons. Sodium ions, potassium ions, and cesium ions contained in sodium titanate, potassium titanate, and cesium titanate, respectively, can be exchanged with protons without breaking the crystal structures. The proton exchange using the acid treatment is performed by adding hydrochloric acid having a concentration of 1M to the starting material and by stirring. It is desirable to perform the acid treatment until the proton exchange is sufficiently completed. A pH may be adjusted by adding an alkaline solution to the solution, at the proton exchange. After the proton exchange, washing with pure water is performed again.

Before performing the proton exchange, it is preferable to pulverize the starting material by using a ball mill. The pulverization enables the proton exchange to be smoothly performed. The pulverization can be performed under pulverization conditions that a zirconia ball having a diameter of approximately 10 mm or more and 15 mm or less is used and that the zirconia ball is rotated at a rotation speed of 600 to 1000 rpm or less for about 1 to 3 hours. Pulverization for one hour or less is not preferred since the starting material is not sufficiently pulverized. In addition, long-time pulverization of three hours or more is not preferred since a mechanochemical reaction is promoted to cause a phase separation into a compound different from a target product.

By washing and drying the product obtained after completion of the proton exchange, a proton exchange product which is an intermediate product is obtained. Subsequently, TiO$_2$(B) (final product) containing V and/or Ta and P is produced by subjecting the proton exchange product to the heat treatment.

A preferred heating temperature is 250° C. or more and 500° C. or less. When the heating temperature is less than 250° C., crystallinity is considerably deteriorated to decrease the electrode capacity, charge-discharge efficiency, and repetition property. On the other hand, when the heating temperature exceeds 500° C., an impurity phase such as an anatase phase is generated and a risk of capacity reduction may be raised. A more preferred heating temperature is 300° C. or more and 400° C. or less.

The active material for batteries of the embodiments can be used not only for a negative electrode, but also for a positive electrode and, use of the active material for either of the negative electrode or the positive electrode can contribute to increase in high capacity of the active material, and to enhancement in the large current characteristics and charge-discharge cycle characteristics when used for batteries.

Next, a non-aqueous electrolyte battery of the embodiments will be explained.

The non-aqueous electrolyte battery of the embodiments comprises an outer container, a positive electrode housed in the outer container, a negative electrode housed in the outer container so as to spatially separate from the positive electrode by, for example, a separator, and a non-aqueous electrolyte contained in the outer container. The negative electrode comprises a negative electrode active material. The negative electrode active material comprises a monoclinic β-type titanium-based oxide or lithium titanium-based oxide. The monoclinic β-type titanium-based oxide or lithium titanium-based oxide has a peak assigned to (011) which appears at $2\theta_1$ in a range of 24.40° or more and 24.88° or less, in an X-ray diffraction pattern obtained by wide angle X-ray diffractometry using CuKα radiation as an X-ray source.

The negative electrode active material may contain V and/or Ta and P. The total content of V and/or Ta may preferably be 3 at % or more and 5 at % or less relative to the monoclinic β-type titanium-based oxide or lithium titanium-based oxide. The content of P may preferably be 0.03 at % or more and 1 at % or less relative to the monoclinic β-type titanium-based oxide or lithium titanium-based oxide.

The outer container, the negative electrode, the positive electrode, the separator and the non-aqueous electrolyte which are the constituent members of the non-aqueous electrolyte battery will be hereinafter described in detail.

1) Outer Container

The outer container is formed of a bag formed from a laminated film having a thickness of 0.5 mm or less or of a metallic container having a thickness of 1.0 mm or less. The metallic container may preferably have a thickness of 0.5 mm or less.

Examples of a shape of the outer container include a flat type (pouch type), a prismatic type, a cylindrical type, a coin type, a button type, and the like. Examples of the outer container include an outer container for a small battery which is mounted to, for example, a mobile electronic device, etc. and an outer container for a large battery which is mounted to a two- or four-wheeled vehicle, etc.

A multilayer film in which a metal layer is formed between resin layers is used as the laminated film. The metal layer may preferably be an aluminum foil or an aluminum alloy foil for reduction of weight. As the resin layer, a polymer material such as polypropylene (PP), polyethylene (PE), nylon, polyethylene terephthalate (PET), and the like may be used. The laminated film can be molded in the shape of the outer case by sealing by thermal fusion bonding.

The metallic container is formed from aluminum, an aluminum alloy or the like. The aluminum alloy may preferably be an alloy containing an element such as magnesium, zinc, silicon, and the like. When a transition metal such as iron, copper, nickel, chrome, and the like is contained in the alloy, an amount of the transition metal may preferably be 100 wt ppm or less.

2) Negative Electrode

The negative electrode comprises a current collector and a negative electrode layer which is formed on one or both of surfaces of the current collector and which contains an active material, a conductive agent and a binder.

The active material comprises a monoclinic β-type titanium-based oxide or lithium titanium-based oxide. The monoclinic β-type titanium-based oxide or lithium titanium-based oxide has a peak assigned to (011) which appears at $2\theta_1$ in a range of 24.40° or more and 24.88° or less, in an X-ray diffraction pattern obtained by wide angle X-ray diffractometry using CuKα radiation as an X-ray source. The active material can contain V and/or Ta and P. The total content of V and/or Ta may preferably be 3 at % or more and 5 at % or less relative to the monoclinic β-type titanium-based oxide or lithium titanium-based oxide. The content of P may preferably be 0.03 at % or more and 1 at % or less relative to the monoclinic β-type titanium-based oxide or lithium titanium-based oxide.

Large current characteristics can be enhanced with a high capacity, by incorporating the negative electrode comprising the negative electrode layer including such an active material into the non-aqueous electrolyte battery.

The conductive agent enhances a power collecting property of the active material and suppresses contact resistance with the current collector. Examples of the conductive agent include acetylene black, carbon black, and black lead.

The binder is capable of binding the active material with the conductive agent. Examples of the binder include polytetrafluoroethylene (PTFE), polyvinylidene fluoride, a fluorine-based rubber, and a styrene butadiene rubber.

The active material, the conductive agent, and the binder in the negative electrode layer may preferably be contained at ratios of 70 mass % or more and 96 mass % or less, 2 mass % or more and 28 mass % or less, and 2 mass % or more and 28 mass % or less, respectively. When the amount of the conductive agent is less than 2 mass %, the power collecting property of the negative electrode layer is deteriorated to raise a risk of deterioration of high current characteristics of the non-aqueous electrolyte battery. In addition, when the amount of the binder is less than 2 mass %, a binding property between the negative electrode layer and the current collector are deteriorated to raise a risk of deterioration of the cycle property. On the other hand, it is preferable to keep each of the amounts of the conductive agent and the binder to 28 mass % or less in order to attain the high capacity.

The current collector may preferably be an aluminum foil or an aluminum alloy foil containing an element such as Mg, Ti, Zn, Mn, Fe, Cu, and Si, which are electrochemically stable within a potential range nobler than 1.0 V.

The negative electrode is produced by, for example, preparing slurry by suspending the active material, the conductive agent, and the binder into a general-purpose solvent, coating the slurry on the current collector, drying, and pressing. Alternatively, the negative electrode may be prepared by forming the active material, conductive agent and binder in a shape of pellet and forming this on the current collector.

3) Positive Electrode

The positive electrode comprises a current collector and a positive electrode layer which is formed on one or both of surfaces of the current collector and which contains an active material, a conductive agent and a binder.

As the active material, for example, an oxide, a polymer or the like can be used.

As the oxide, for example, manganese dioxide ($MnO_2$), iron oxide, copper oxide, and nickel oxide, in each of which lithium is occluded, and lithium manganese composite oxide (e.g., $Li_xMn_2O_4$ and $Li_xMnO_2$), lithium nickel composite oxide (e.g., $Li_xNiO_2$), lithium cobalt composite oxide ($Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), spinel type lithium manganese nickel composite oxide (e.g., $Li_xMn_{2-y}Ni_yO_4$), lithium phosphor oxide having an olipine structure (e.g., $Li_xFePO_4$, $Li_xFe_{1-y}Mn_yPO_4$, $Li_xCoPO_4$), iron sulfate ($Fe_2(SO_4)_3$), and vanadium oxide ($V_2O_5$) are usable. Here, x and y may preferably be $0<x\leq 1$ and $0\leq y\leq 1$.

As the polymer, for example, a conductive polymer material such as polyaniline and polypyrrole or a disulfide-based polymer material can be used. Sulfur (S) and carbon fluoride are also usable as the active material.

Examples of a preferred active material include lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($Li_xNi_{1-y}Co_yO_2$), spinel type lithium manganese nickel composite oxide ($Li_xMn_{2-y}Ni_yO_4$), lithium manganese cobalt composite oxide ($Li_xMn_yCo_{1-y}O_2$), and lithium iron phosphate ($Li_xFePO_4$), each of which has a high positive electrode voltage. Here, x and y may preferably be $0<x\leq 1$ and $0\leq y\leq 1$.

A more preferred active material is lithium cobalt composite oxide or lithium manganese composite oxide. Since these active materials have high ion conduction property, diffusion of lithium ions in the positive electrode active material hardly progresses to a rate-controlling step in the combination with the above-described negative electrode active material. The active materials are therefore excellent in compatibility with the lithium titanium composite oxide in the negative electrode active material.

The conductive agent enhances a power collecting property of the active material and suppresses contact resistance with the current collector. Examples of the conductive agent include a carbonaceous substance such as acetylene black, carbon black, and black lead.

The binder binds the active material and the conductive agent with each other. Examples of the binder include polytetrafluoroethylene (PTFE), polyvinylidene fluoride, and a fluorine-based rubber.

The active material, the conductive agent, and the binder in the positive electrode layer may preferably be contained at ratios of 80 mass % or more and 95 mass % or less, 3 mass % or more and 18 mass % or less, and 2 mass % or more and 17 mass % or less, respectively. The conductive agent can exert the above-described effect when the amount of the conductive agent is 3 mass % or more. The conductive agent can suppress decomposition of the non-aqueous electrolyte on surfaces of the conductive agent under high temperature storage by setting the amount of the conductive agent to be 18 mass % or less. The binder can attain satisfactory positive electrode strength when the amount of the binder is 2 mass % or more. The binder can reduce the content of a binder which is an insulating material in the positive electrode and reduce internal resistance when the amount of the binder is 17 mass % or less. The current collector may preferably be an aluminum foil or an aluminum alloy foil containing an element such as Mg, Ti, Zn, Mn, Fe, Cu, and Si.

The positive electrode is produced by, for example, preparing slurry by suspending the active material, the conductive agent, and the binder into a general-purpose solvent, coating the slurry on the current collector, drying, and pressing. The positive electrode may be prepared by forming the active material, conductive agent and binder into pellets to form a positive electrode layer, and forming the negative electrode layer on the current collector.

4) Non-Aqueous Electrolyte

Examples of the non-aqueous electrolyte include a liquid non-aqueous electrolyte which is prepared by dissolving an electrolyte into an organic solvent and a gel non-aqueous electrolyte which is a composite of a liquid electrolyte and a polymer material.

The liquid non-aqueous electrolyte may preferably be obtained by dissolving an electrolyte into the organic acid at a concentration of 0.5 M or more and 2.5 M or less.

Examples of the electrolyte include lithium salts of lithium perchlorate ($LiClO_4$), lithium hexafluorophosphate ($LiPF_6$), lithium tetrafluoroborate ($LiBF_4$), lithium hexafluoro arsenate ($LiAsF_6$), lithium trifluoromethasulfonate ($LiCF_3SO_3$), and bistrifluoromethylsulfonyl imitritium [$LiN(CF_3SO_2)_2$] and mixtures thereof. The electrolyte may preferably be hardly oxidized even in high potential, and $LiPF_6$ is most preferred.

Examples of the organic solvent include a cyclic carbonate such as propylene carbonate (PC), ethylene carbonate (EC), and vinylene carbonate; a chain carbonate such as diethyl carbonate (DEC), dimethyl carbonate (DMC), and methylethyl carbonate (MEC); a cyclic ether such as tetrahydrofuran (THF), 2-methyl tetrahydrofuran (2MeTHF), and dioxolan (DOX); a chain ether such as dimethoxyethane (DME) and diethoxy ethane (DEE); γ-butyrolactone (GBL); acetonitrile (AN); and sulfolane (SL). The organic solvents may be used alone or in the form of a mixture solvent.

Examples of the polymer material include polyvinylidene fluoride, polyacrylonitrile, and polyethylene oxide.

The organic solvent may preferably be the mixture solvent including one or more organic solvents selected from the group consisting of propylene carbonate (PC), ethylene carbonate (EC), and γ-butyrolactone (GBL).

5) Separator

Examples of the separator include a porous film containing polyethylene, polypropylene, cellulose, or polyvinylidene fluoride, and a nonwoven fabric of a synthetic resin. The porous film may preferably be formed from polyethylene or polypropylene, and can improve safety since it is capable of being molten at a certain temperature and of blocking a current.

Figure 2:
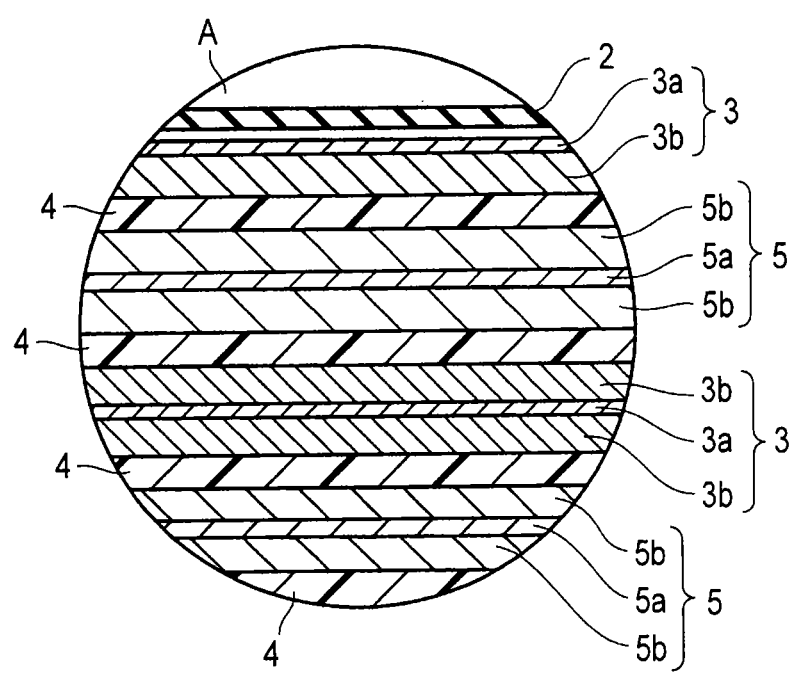
FIG. 2 is an enlarged cross-sectional view showing a part A of FIG. 1.

Next, a non-aqueous electrolyte battery of the embodiments (for example, a flat type non-aqueous electrolyte battery in which the outer container is made from a laminated film) will be described in more details with reference to FIG. 1 and FIG. 2. FIG. 1 is a sectional view of a thin type non-aqueous electrolyte battery and FIG. 2 is an enlarged sectional view of the A part of FIG. 1. Each drawing is a typical view for explaining the invention and for promoting the understanding thereof. Though there are parts different from an actual battery in shape, dimension and ratio, these structural designs may be properly changed taking the following explanations and known technologies into consideration.

A flattened wound electrode group 1 is housed in a bag-like outer container 2 formed from a laminated film which is obtained by inserting an aluminum foil between two resin layers. The flattened wound electrode group 1 is formed by spirally wounding a laminate obtained by laminating a negative electrode 3, a separator 4, a positive electrode 5, and a separator 4 in this order from the outside and by press-molding. The negative electrode 3 which is an outermost shell has a structure that a negative electrode layer 3b is formed on one of inner surfaces of a negative electrode current collector 3a as shown in FIG. 2. The rest of the negative electrodes 3 have a structure that the negative electrode layer 3b is formed on both surfaces of the current collector 3a. The positive electrode 5 has a structure that a positive electrode layer 3b is formed on both surfaces of a current collector 5a.

The active material in the negative electrode layer 3b contains TiO$_2$(B) in which the position $2\theta_1$ of the peak belonging to (011) is in a range of 24.40° or more and 24.88° or less, i.e., smaller than the position $2\theta_0$ of the peak, which is 24.93°, belonging to (011) of the existing TiO$_2$(B), in the X-ray diffraction pattern obtained by wide angle X-ray diffractometry using CuKα rays as an X-ray source. TiO$_2$(B) has a composition containing, for example, V and/or Ta, and P. The total contents of V and Ta may preferably be 0.3 at % or more and 5 at % or less relative to the active material. The content of P may preferably be 0.03 at % or more and 1 at % or less relative to the active material.

In the vicinity of an outer periphery of the flattened wound electrode group 1, a negative electrode terminal 6 is connected to the negative electrode current collector 3a of the negative electrode 3 which is the outermost shell, and a positive electrode terminal 7 is connected to the positive electrode current collector 5a of the inner positive electrode 5. The negative electrode terminal 6 and the positive electrode terminal 7 are extended from an opening of the bag-like outer container 2 to the outside. For example, the liquid non-aqueous electrolyte is injected through the opening of the bag-like outer container 2. The flattened wound electrode group 1 and the liquid non-aqueous electrolyte are completely sealed by heat-sealing the opening of the bag-like outer container 2 with the negative electrode terminal 6 and the positive electrode terminal 7 being inserted into the opening.

For the negative electrode terminal 6, for example, a material which has electrical stability and conductivity when a potential for lithium ions is within a range of 1.0 V or more and 3.0 V or less can be used. More specifically, examples of the material include aluminum or an aluminum alloy containing an element such as Mg, Ti, Zn, Mn, Fe, Cu, and Si. The negative electrode terminal 6 may preferably be a material which is the same as that used for the negative electrode current collector 3a to reduce a contact resistance with the negative electrode current collector 3a.

For the positive electrode terminal 7, a material which has electrical stability and conductivity when a potential for lithium ions is within a range of 3.0 V or more and 4.25 V or less may be used. More specifically, examples of the material include aluminum or an aluminum alloy containing an element such as Mg, Ti, Zn, Mn, Fe, Cu, and Si. The positive electrode terminal 7 may preferably be a material which is the same as that used for the positive electrode current collector 5a to reduce a contact resistance with the positive electrode current collector 5a.

Next, a battery pack of the embodiments will be described in detail.

The battery pack of the embodiments has a plurality of non-aqueous electrolyte batteries (unit cell) described above. The unit cell may be electrically connected in series or in parallel, or are electrically connected and disposed in series and parallel in combination.

Such a battery pack has an excellent cycle property.

That is, the position $2\theta_0$ of the peak belonging to (011) of the existing TiO$_2$(B) is 24.93° in the X-ray diffraction pattern obtained by wide angle X-ray diffractometry using CuKα rays as an X-ray source. While the above-described non-aqueous electrolyte battery comprises the negative electrode including the active material containing TiO$_2$(B) in which the position $2\theta_1$ of the peak belonging to (011) is in a range of 24.40° or more and 24.88° or less, which is smaller than 24.93°, in the same X-ray diffraction pattern. Owing to this, the above-described non-aqueous electrolyte battery is capable of improving the high current characteristics and the charge-discharge cycle property while exploiting the high capacity of TiO$_2$(B). As a result, the battery pack obtained by incorporating a plurality of the batteries is capable of improving the charge-discharge cycle property.

Next, an example of the battery pack of the embodiments will be specifically described with reference to FIG. 3 and FIG. 4. As the unit battery, the flat type non-aqueous electrolyte battery shown in FIG. 1 is used.

A plurality of unit cells 21 are layered such that the negative electrode terminal 6 and the positive electrode terminal 7 extended to the outside are oriented to an identical direction, and are fastened by an adhesive tape 22 to form an assembled battery 23. The unit cells 21 are electrically connected in series as shown in FIG. 4.

A printed wiring board 24 is arranged to be opposed to a side surface of the unit battery 21 from which the negative electrode terminal 6 and the positive electrode terminal 7 is extended. As shown in FIG. 4, a thermistor 25, a protection circuit 26, and a communication terminal 27 for communication with an external device are mounted on the printed wiring board 24. An insulating plate (not shown) is attached to a surface of the protection circuit board 24 opposed to the assembled battery 23 to avoid unnecessary connection with interconnects of the assembled battery 23.

A positive electrode side lead 28 is connected to the positive electrode terminal 7 positioned at the lowermost layer of the assembled battery 23, and a leading end of the lead is inserted into a positive electrode connector 29 of the printed wiring board 24 for electric connection. A negative electrode side lead 30 is connected to the negative electrode terminal 6 positioned at the uppermost layer of the assembled battery 23, and a leading end of the lead is inserted into a negative electrode connector 31 of the printed wiring board 24 for electric connection. The connectors 29 and 31 are connected to the protection circuit 26 through interconnects 32 and 33 formed on the printed wiring board 24.

The thermistor 25 is used to detect a temperature of the unit cell 21, and the detection signal is sent to the protection circuit 26. The protection circuit 26 can block plus wiring 34a and minus wiring 34b between the protection circuit 26 and the communication terminal 27 for communication with external appliance under a predetermined condition. The predetermined condition may be, for example, a detection temperature of the thermistor 25 which is equal to or a higher than a predetermined temperature. In addition, the predetermined condition may be a detection of overcharge, overdischarge, overcurrent, or the like of the unit cell 21. The detection of overcharge or the like is performed on each of the unit cells 21 or all of the unit cells 21. When each of the unit cells 21 is detected, a battery voltage may be detected, or a positive potential or a negative potential may be detected. In the latter case, a lithium electrode to be used as a reference electrode is inserted into each of the unit cells 21. In the case of FIG. 3 and FIG. 4, an interconnect 35 for voltage detection is connected to each of the unit cells 21, and a detection signal is sent to the protection circuit 26 through the interconnect 35.

A protection sheet 36 formed from rubber or a resin is disposed on each of three side surfaces of the assembled battery 23 except for the side surface from which the positive electrode terminal 7 and the negative electrode terminal 6 are projected.

The assembled battery 23 is housed in a housing container 37 together with each protection sheet 36 and the printed wiring board 24. In other words, the protection sheets 36 are disposed on inner surfaces in a long-side direction of the housing container 37 and an inner surface in a short-side direction, and the printed wiring board 24 is disposed on an inner surface in the short-side direction at an opposite side. The assembled battery 23 is positioned in a space enclosed by the protection sheets 36 and the printed wiring board 24. A cover 38 is attached to an upper surface of the housing container 37.

A heat-shrinkable tape may be used for fixing the assembled battery 23 instead of the adhesive tape 22. In this case, the protection sheets are disposed on both sides of the assembled battery, and the heat-shrinkable tape is put around the assembled battery 23, followed by heat shrinkage of the heat-shrinkable tape for bundling the electric battery.

The example of series connection of the unit cells 21 is shown in FIG. 3 and FIG. 4, but parallel connection or connection in which series connection and parallel connection are combined may be employed to increase the battery capacity. The assembled battery packs can also be connected in series or in parallel.

In addition, the aspect of the battery pack may appropriately be changed depending on application. The application of the battery pack may preferably include application exhibiting the excellent cycle property when a high current is drawn. Specific examples include application as a power source of a digital camera and application to a vehicle such as a two- or four-wheeled hybrid electric vehicle, a two- or four-wheeled electric vehicle, and a power-assisted bicycle. In particular, the application to a vehicle is suitable.

As described above, the non-aqueous electrolyte battery can exhibit the excellent high temperature property by using the mixture solvent obtained by mixing at least two solvents selected from the group consisting of propylene carbonate (PC), ethylene carbonate (EC) and γ-butyrolactone (GBL), and or by using the non-aqueous electrolyte containing γ-butyrolactone (GBL). The battery pack including a plurality of non-aqueous electrolyte batteries mentioned above is particularly suitable for use in vehicles.

Examples of the embodiments will be hereinafter described. The embodiments are not limited to the examples described below insofar as the examples do not deviate from the scope of the embodiments.

EXAMPLE 1 <Synthesis of Titanium Composite Oxide>

First, potassium carbonate ($K_2CO_3$), anatase type titanium oxide ($TiO_2$), vanadium pentoxide ($V_2O_5$), and phosphorus pentoxide ($P_2O_5$) were mixed, and baked at 1100° C. for 24 hours to obtain $K_2Ti_4O_9$ including V and P. Obtained $K_2Ti_4O_9$ was subjected to particle size adjustment by dry pulverization using zirconia beads and then washed in pure water to obtain a proton exchange precursor. The obtained proton exchange precursor was thrown into a 1M hydrochloric acid solution, and stirred under an environment of 25° C. for 12 hours, and a proton exchange product was thereby obtained.

A titanium composite oxide was produced by baking the obtained proton exchange product in air at 400° C. for 3 hours.

X-ray diffraction of the obtained titanium composite oxide was conducted under the conditions described below. As a result, the X-ray diffraction pattern shown in FIG. 5 was obtained, and it was thus confirmed that a main substance forming the titanium composite oxide is monoclinic n-type titanium composite oxide belonging to JCPDS: 46-1237.

<Measurement Method>
A standard glass holder having a diameter of 25 mm was filled with a sample, and a measurement was conducted by employing wide angle X-ray diffractometry. A measurement apparatus and conditions are described below.
(1) X-ray diffraction apparatus: D8 ADVANCE (tube type) manufactured by Bruker AXS X-ray source: CuKα radiation (using Ni filter)
Output: 40 kV, 40 mA
Slit system: Div. Slit; 0.3°
Detector: LynxEye (high speed detector)
(2) Scanning method: 2θ/θ continuous scanning
(3) Measurement range (2θ): 5 to 100°
(4) Step width (2θ): 0.01712°
(5) Counting time: 1 sec/step.

The contents of V and P of the obtained titanium composite oxide were measured by employing ICP emission spectroscopy. As a result, it was confirmed that the content of V was 2.0 at % relative to the titanium oxide and that the content of P was 0.16 at % relative to the titanium oxide.

<Manufacture of Electrode>
Slurry was prepared by adding 90 mass % of the obtained titanium oxide powder, 5 mass % of acetylene black, and 5 mass % of polyvinylidene fluoride to N-methylpyrrolidone (NMP) and mixing. The slurry was applied on both surfaces of a current collector made of an aluminum foil having a thickness of 15 μm, and dried. After that, a negative electrode having an electrode density of 2.3 g/cm³ was manufactured by pressing.

<Preparation of Liquid Non-Aqueous Electrolyte>
Ethylene carbonate (EC) and diethyl carbonate (DEC) were mixed at a volumetric ratio of 1:2 to obtain a mixture solvent. By dissolving $LiPF_6$ which was an electrolyte at a concentration of 1M into the mixture solvent, a liquid non-aqueous electrolyte was prepared.

<Manufacture of Beaker Cell>
The manufactured electrode serving as a working electrode, and a lithium metal serving as a counter electrode and a reference electrode were arranged inside a beaker, and the liquid non-aqueous electrolyte was injected into the beaker to complete a beaker cell.

EXAMPLES 2-6, COMPARATIVE EXAMPLE 1

The active material for batteries was synthesized in the same manner as Example 1 to assemble a beaker cell, except for varying the V amount as shown below in Table 1.

EXAMPLES 7 AND 8

The active material for batteries was synthesized in the same manner as Example 1 to assemble a beaker cell, except for using tantalum pentoxide ($Ta_2O_5$) instead of vanadium pentoxide ($V_2O_5$).

EXAMPLE 9

The active material for batteries was synthesized in the same manner as Example 1 to assemble a beaker cell, except for varying the V and Ta amounts as shown below in Table 1, and using both vanadium pentoxide ($V_2O_5$) and tantalum pentoxide ($Ta_2O_5$).

EXAMPLES 10-13, COMPARATIVE EXAMPLE 2

The active material for batteries was synthesized in the same manner as Example 1 to assemble a beaker cell, except for varying the P amount as shown below in Table 1.

COMPARATIVE EXAMPLE 3

The active material for batteries was synthesized in the same manner as Example 1 to assemble a beaker cell, except for using $K_2Ti_4O_9$ obtained by mixing potassium carbonate ($K_2CO_3$) and anatase type titanium oxide ($TiO_2$) and baking the mixture at 1100° C. for 24 hours.

Figure 5:
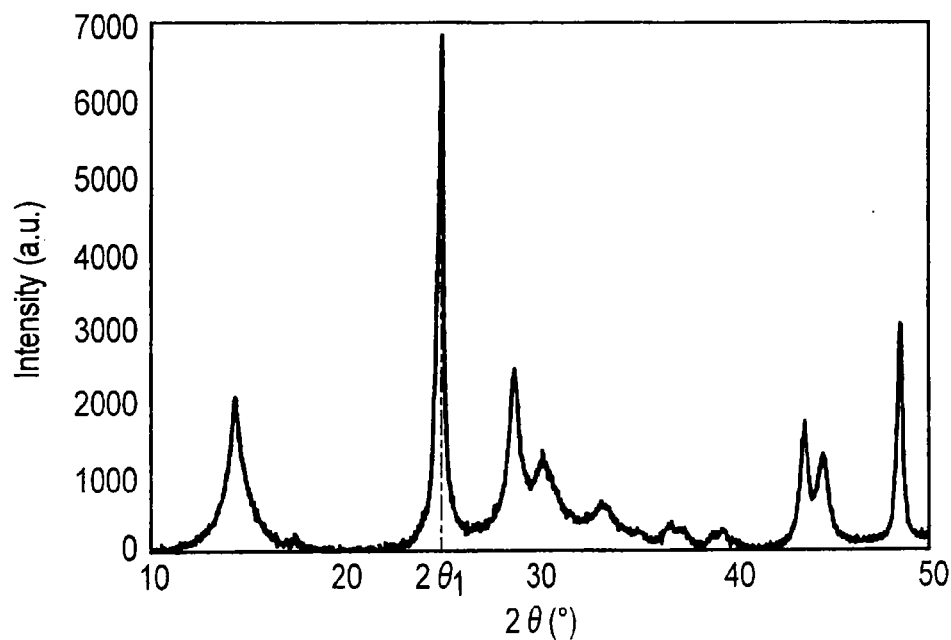
FIG. 5 is a graph showing an X-ray diffraction pattern of titanium composite oxide of Example 3.

The titanium-based oxide [monoclinic beta-type titanium-based oxide (TiO$_2$(B))] obtained in Example 3 was subjected to X-ray diffraction under the same conditions as Example 1. As a result, X-ray diffraction patterns shown in FIG. 5 and FIG. 6 were obtained. The X-ray diffraction pattern in FIG. 5 shows that 2θ is a range of 10° or more and 50° or less, and the X-ray diffraction pattern in FIG. 5 shows that 2θ is a range of 20° or more and 30° or less.

Figure 6:
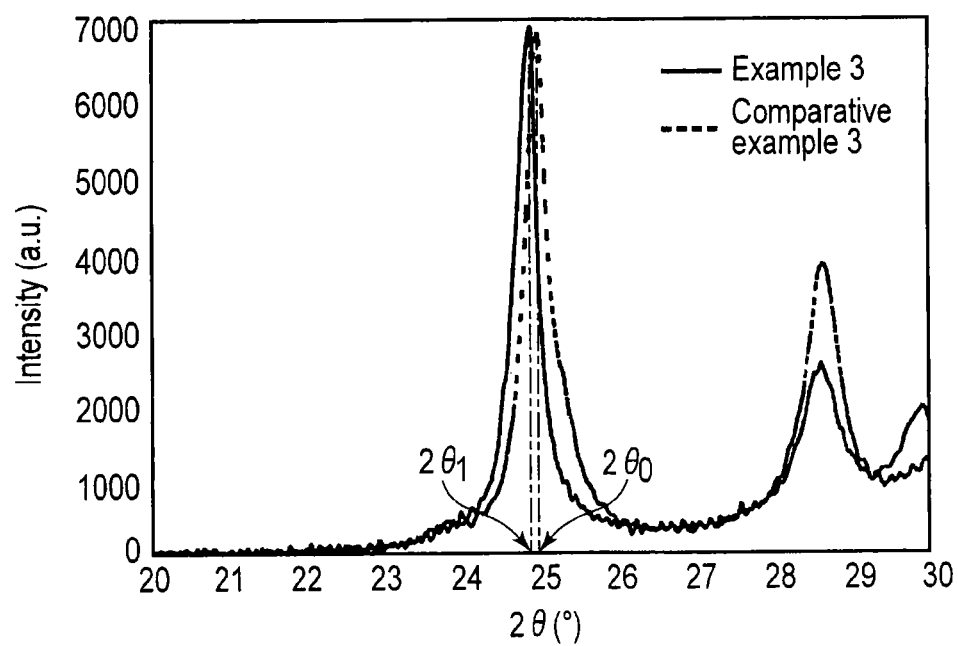
FIG. 6 is a graph showing X-ray diffraction patterns of titanium composite oxides of Example 3 and Comparative Example 3.

The titanium-based oxide [monoclinic beta-type titanium-based oxide (TiO$_2$(B))] obtained in Comparative Example 3 was subjected to X-ray diffraction under the same conditions as Example 1. The X-ray diffraction pattern thereby obtained is also shown in FIG. 6. FIG. 6 shows the X-ray diffraction pattern of TiO$_2$(B) obtained in Example 3 by a solid line, and the X-ray diffraction pattern of TiO$_2$(B) obtained in Comparative Example 3 by a broken line. With reference to FIG. 6, TiO$_2$(B) obtained in Example 3 has the position 2θ$_1$ of the peak belonging to (011) at 24.82° in the X-ray diffraction. This position is smaller than the position 2θ$_0$ of the peak, 24.93°, belonging to (011) of TiO$_2$(B) obtained in Comparative Example 3.

Charging and discharging were conducted in a voltage range from 1 to 3 VvsLi/Li$^+$ in an environment of 25° C. in the beaker cells obtained in Examples 1-13 and Comparative Examples 1-3 to obtain 0.2C capacity and 1C capacity per active material unit mass. 0.2C capacity and a ratio X(%) of 1C capacity/0.2C capacity are shown in Table 1. In addition, the position 2θ$_0$ of the peak belonging to (011), and the contents of V, Ta and P, of the active material (TiO$_2$(B)) Examples 1-13 and Comparative Examples 1-3 are shown below in Table 1.

TABLE 1

| | (011) peak position 2θ$_1$ [°] | (V, Ta) [at %] | V + Ta [at %] | P [at %] | 0.2 C capacity [mAh/g] | X [%] |
|---|---|---|---|---|---|---|
| Comparative Example 1 | 24.93 | — | — | 0.17 | 210 | 92 |
| Example 1 | 24.88 | (0.3, 0) | 0.3 | 0.17 | 230 | 97 |
| Example 2 | 24.85 | (1.0, 0) | 1.0 | 0.17 | 244 | 98 |
| Example 3 | 24.82 | (2.0, 0) | 2.0 | 0.16 | 248 | 98 |
| Example 4 | 24.72 | (3.0, 0) | 3.0 | 0.16 | 252 | 98 |
| Example 5 | 24.60 | (4.0, 0) | 4.0 | 0.16 | 244 | 97 |
| Example 6 | 24.50 | (5.0, 0) | 5.0 | 0.16 | 235 | 96 |
| Example 7 | 24.76 | (0, 1.0) | 1.0 | 0.17 | 240 | 97 |
| Example 8 | 24.70 | (0, 2.0) | 2.0 | 0.16 | 244 | 98 |
| Example 9 | 24.76 | (1.0, 1.0) | 2.0 | 0.16 | 246 | 98 |
| Comparative Example 2 | 24.90 | (2.0, 0) | 2.0 | — | 220 | 92 |
| Example 10 | 24.85 | (2.0, 0) | 2.0 | 0.03 | 235 | 96 |
| Example 11 | 24.60 | (1.9, 0) | 1.9 | 0.37 | 254 | 98 |
| Example 12 | 24.52 | (1.9, 0) | 1.9 | 0.61 | 250 | 97 |
| Example 13 | 24.40 | (1.9, 0) | 1.9 | 1.01 | 230 | 96 |
| Comparative Example 3 | 24.93 | — | — | — | 185 | 90 |

As apparent from Table 1, it can be understood that the beaker cells of Examples 1-13 using the negative electrode active material containing TiO$_2$(B) in which the position 2θ$_1$ of the peak belonging to (011) is in a range of 24.40° or more and 24.88° or less have a greater 0.2C capacity, a greater 1C capacity/0.2C capacity ratio, a higher capacity and more excellent large current characteristics than the beaker cells of Comparative Examples 1-3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material for batteries comprising a monoclinic β-type titanium-based oxide or lithium titanium-based oxide, the monoclinic β-type titanium-based oxide or lithium titanium-based oxide having a peak belonging to (011), which appears at 2θ$_1$ in a range of 24.40° or more and 24.88° or less, in an X-ray diffraction pattern obtained by wide angle X-ray diffractometry using CuKα, radiation as an X-ray source.

2. The active material for batteries of claim 1, wherein the position 2θ$_1$ of the peak belonging to (011) of the monoclinic β-type titanium-based oxide or lithium titanium-based oxide in the X-ray diffraction pattern is smaller than position 2θ$_0$ of the peak, which is 24.93°, belonging to (011) of the existing monoclinic β-type titanium-based oxide or lithium titanium-based oxide.

3. The active material for batteries of claim 1, wherein the position 2θ$_1$ of the peak belonging to (011) of the monoclinic β-type titanium-based oxide or lithium titanium-based oxide in the X-ray diffraction pattern is in a range of 24.40° or more and 24.85° or less.

4. The active material for batteries of claim 1, wherein the monoclinic β-type titanium-based oxide or lithium titanium-based oxide comprises P and at least one of V and Ta.

5. The active material for batteries of claim 4, wherein total contents of V and Ta are 0.3 at % or more and 5 at % or less relative to the monoclinic β-type titanium-based oxide or lithium titanium-based oxide, and a content of P is 0.03 at % or more and 1 at % or less relative to the monoclinic β-type titanium-based oxide or lithium titanium-based oxide.

6. The active material of claim 1, comprising the monoclinic β-type titanium-based oxide.

7. The active material of claim 1, comprising the lithium titanium-based oxide.

8. The active material of claim 1, wherein the monoclinic β-type titanium-based oxide or lithium titanium-based oxide comprises P, V and Ta.

9. A non-aqueous electrolyte battery, comprising:
an outer container;
a positive electrode housed in the outer container;
a negative electrode housed in the outer container so as to spatially separate from the positive electrode, the negative electrode including a negative electrode active material; and
a non-aqueous electrolyte in the outer container,
wherein the negative electrode active material comprises a monoclinic β-type titanium-based oxide or lithium titanium-based oxide, and
the monoclinic β-type titanium-based oxide or lithium titanium-based oxide has a peak belonging to (011) which appears at $2\theta_1$ in a range of 24.40° or more and 24.88° or less, in an X-ray diffraction pattern obtained by wide angle X-ray diffractometry using CuKα radiation as an X-ray source.

10. The non-aqueous electrolyte battery of claim 9, wherein the position $2\theta_1$ of the peak belonging to (011) of the monoclinic β-type titanium-based oxide or lithium titanium-based oxide in the X-ray diffraction pattern is smaller than position $2\theta_0$ of the peak, which is 24.93°, belonging to (011) of the existing monoclinic β-type titanium-based oxide or lithium titanium-based oxide.

11. The non-aqueous electrolyte battery of claim 9, wherein the position $2\theta_1$ of the peak belonging to (011) of the monoclinic β-type titanium-based oxide or lithium titanium-based oxide in the X-ray diffraction pattern is in a range of 24.40° or more and 24.85° or less.

12. The non-aqueous electrolyte battery of claim 9, wherein the monoclinic β-type titanium-based oxide or lithium titanium-based oxide has a crystallite diameter of 10 nm or more calculated from the peak belonging to (011), in the X-ray diffraction pattern obtained by the wide angle X-ray diffractometry using CuKα radiation as an X-ray source.

13. The non-aqueous electrolyte battery of claim 9, wherein the monoclinic β-type titanium-based oxide or lithium titanium-based oxide comprises P and at least one of V and Ta.

14. The non-aqueous electrolyte battery of claim 13, wherein total contents of V and Ta are 0.3 at % or more and 5 at % or less relative to the monoclinic β-type titanium-based oxide or lithium titanium-based oxide, and a content of P is 0.03 at % or more and 1 at % or less relative to the monoclinic β-type titanium-based oxide or lithium titanium-based oxide.

15. A battery pack, comprising a plurality of the non-aqueous electrolyte battery of claim 9, said plurality of batteries being electrically connected in series or in parallel, or in series and parallel.

16. The battery pack of claim 15, further comprising a protection circuit capable of detecting a voltage of each non-aqueous electrolyte battery in the plurality of batteries.

17. A battery pack, comprising a plurality of the non-aqueous electrolyte battery of claim 13, said plurality of batteries batteries being electrically connected in series or in parallel, or in series and parallel.

18. The non-aqueous electrolyte battery of claim 17, wherein total contents of V and Ta are 0.3 at % or more and 5 at % or less relative to the monoclinic β-type titanium-based oxide or lithium titanium-based oxide, and a content of P is 0.03 at % or more and 1 at % or less relative to the monoclinic β-type titanium-based oxide or lithium titanium-based oxide.

* * * * *